Sept. 16, 1958  G. R. ASCHAUER  2,851,895
MARINE GEAR DRIVE
Filed Nov. 17, 1953  3 Sheets-Sheet 2
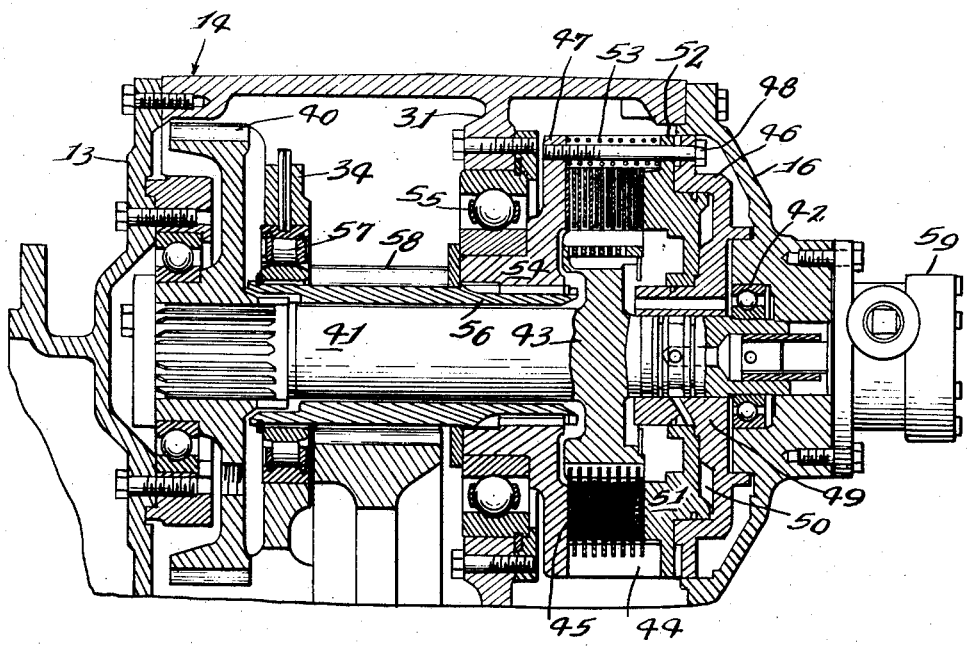
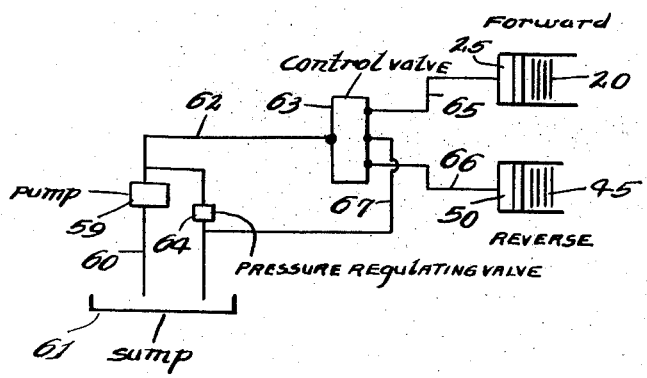
Inventor.
George R. Aschauer.

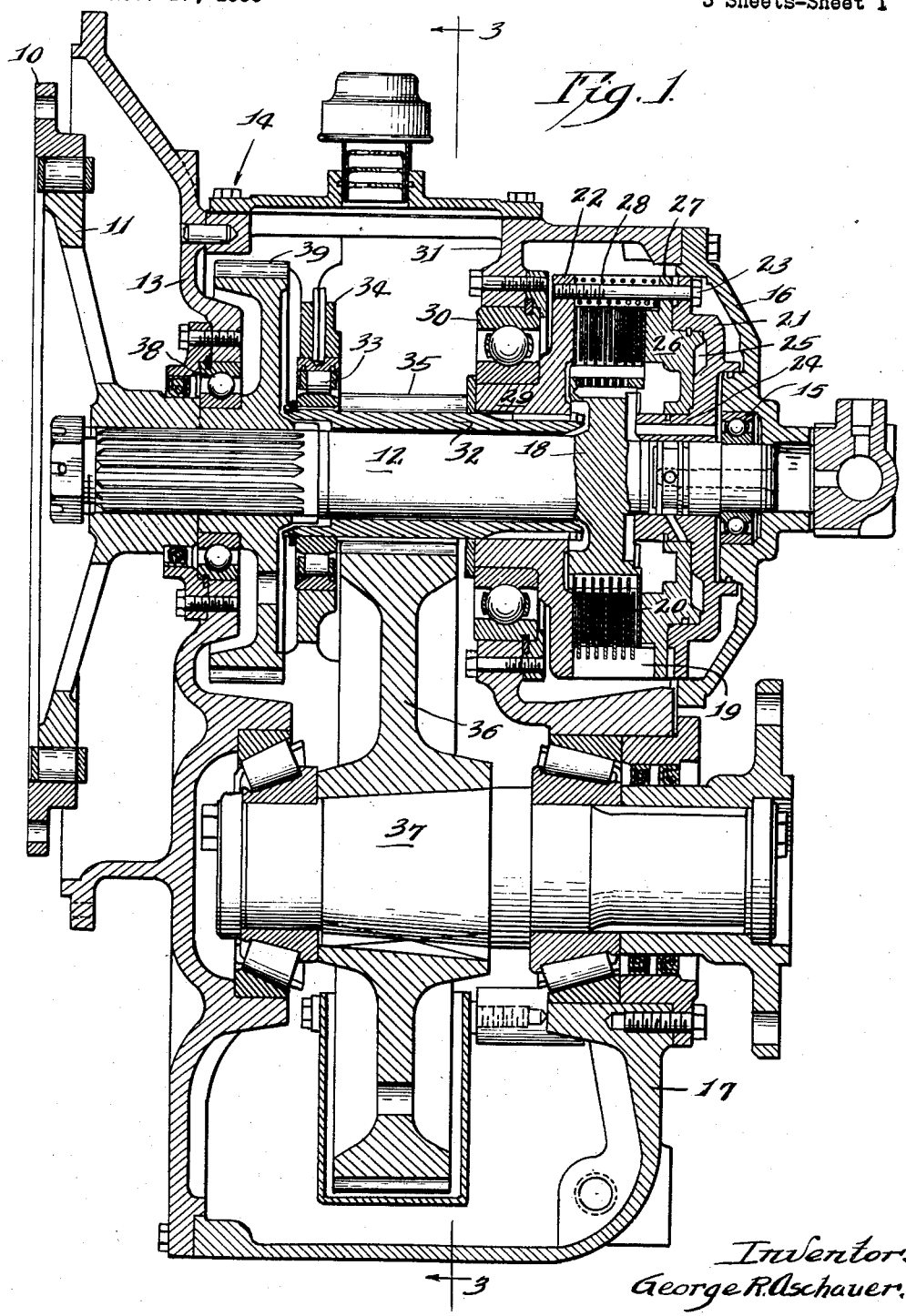

Sept. 16, 1958 — G. R. ASCHAUER — 2,851,895
MARINE GEAR DRIVE
Filed Nov. 17, 1953 — 3 Sheets-Sheet 3

Inventor.
George R. Aschauer.
By

United States Patent Office 2,851,895
Patented Sept. 16, 1958

2,851,895

MARINE GEAR DRIVE

George R. Aschauer, Racine, Wis., assignor to Twin Disc Clutch Company, Racine, Wis., a corporation of Wisconsin Application November 17, 1953, Serial No. 392,725

4 Claims. (Cl. 74—361)

My invention relates to marine gears and more particularly to a transmission of this type which is selectively conditioned to provide forward and reverse drives to the propeller shaft of a vessel.

One object of the invention is to provide a marine gear employing selectively operable, friction clutches for determining forward and reverse drive in which the component parts are related to materially shorten the overall length of the gear with accompanying saving of space and the provision of stiffer construction.

A further object is to provide a transmission wherein the output shaft carries a gear through which either drive transmits power, thus simplifying the overall construction and enabling the use of pinions and gears of substantial width.

A further object is the provision of a marine gear of the character indicated in which the clutches are mounted on separate shafts adjacent one end of a housing enclosing the gear where they are easily accessible for repair through a removable end plate.

These and further objects of the invention will be set forth in the following specification, reference being had to the accompanying drawings, and the novel means by which said objects are effectuated will be definitely pointed out in the claims.

In the drawings:

Figs. 1 and 2 are longitudinal sections of the gear showing the forward and reverse drives, respectively, with the clutches in neutral position.

Fig. 4 is a schematic layout showing a typical hydraulic system for controlling operation of the clutches.

Figure 3:
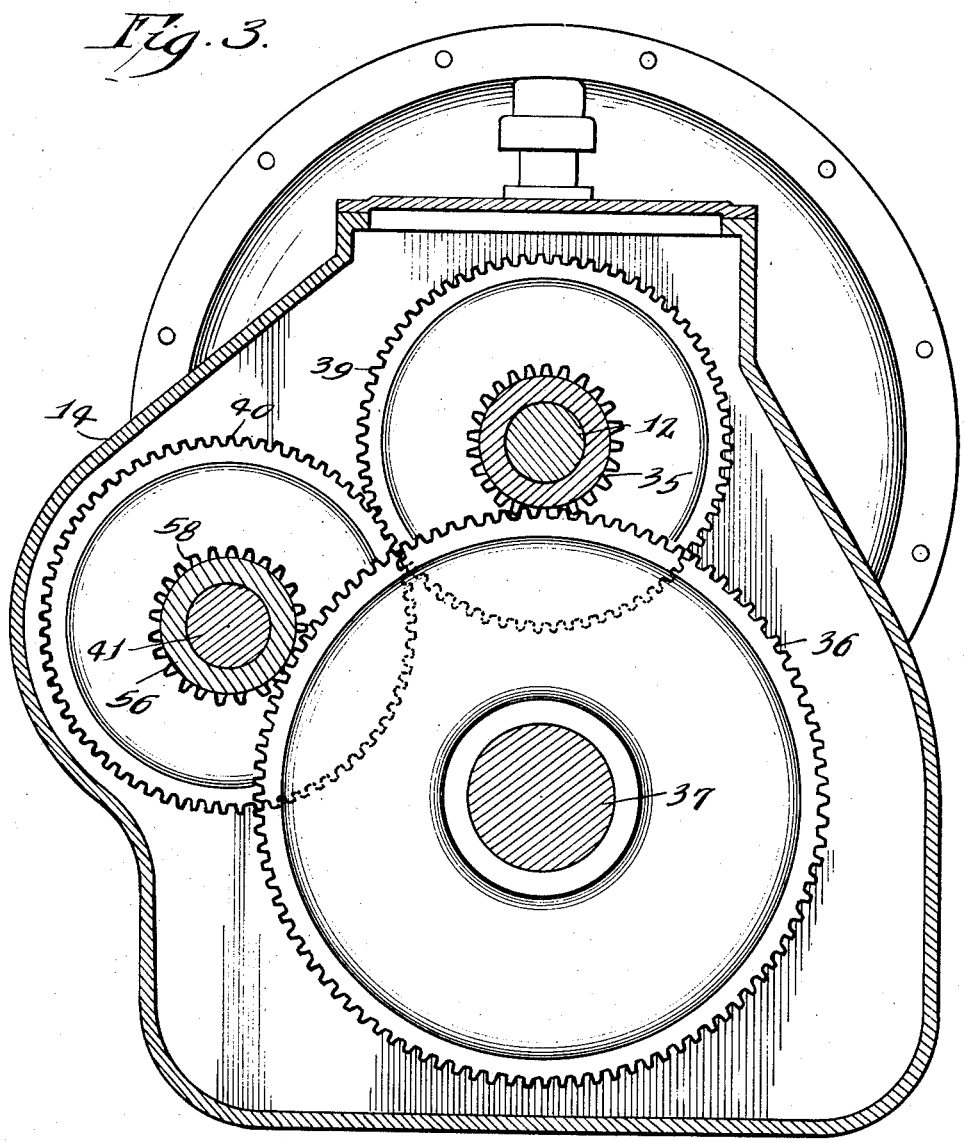
Fig. 3 is a section along the line 3—3 in Fig. 1 showing the relation of the input shaft, countershaft and output shaft.

Referring to Fig. 1, the numeral 10 designates an internally toothed ring which is appropriately attached to a driving member (not shown), such as the flywheel of the vessel's power plant, and which meshes with a peripherally toothed spider 11 whose hub is keyed to an input shaft 12. This shaft extends through an end wall 13 which closes the forward end of a gear housing 14 and the right end of the shaft is journaled in a bearing 15 carried by a detachable cover plate 16 that is secured to the rear end wall 17 of the gear housing.

At a convenient distance from the bearing 15 and inwardly of the housing 14, the shaft 12 includes an annulus 18 whose periphery is suitably toothed for relative axial sliding and driving engagement with a first plurality of clutch plates which are alternately related to a second plurality of clutch plates whose peripheries have driving and sliding engagement with a plurality of circumferentially spaced, cantilever arms 19. These clutch plates constitute part of a forward drive clutch 20 and the arms 19 extend between a back plate 21 and an abutment plate 22 with which the arms are integrally formed and this subassembly is secured together by a plurality of circumferentially spaced bolts 23. The back plate 21 includes a hub 24 that encircles the input shaft 12 between the bearing 15 and the annulus 18, and is otherwise suitably shaped on the clutch plate side to form an annular chamber 25 whose inner circumferential surface is defined by the hub 24.

An annular piston 26 is slidable in the chamber 25 in actuating relation to the plates of the forward drive clutch 20 and its periphery includes a plurality of lugs 27 which are slidable on the bolts 23 so that the piston 26 rotates with the clutch 20 when engaged. A helical spring 28 encircles each bolt 23 between the abutment plate 22 and the associated lug 27 and these springs act to shift the piston 26 to the release position shown in Fig. 1 when the actuating pressure is cut off.

The abutment plate 22, against which the plates of the clutch 20 are engaged, includes a hub 29 that is externally journaled in a bearing 30 carried by a first internal wall 31 in the housing 14 and is internally splined for connection to the adjacent end of a sleeve 32 that coaxially encircles and is spaced from the input shaft 12. The opposite end of the sleeve 32 is journaled in a bearing 33 carried by a second internal wall 34. Between the bearings 30 and 33, the sleeve 32 includes a pinion 35 which meshes with a gear 36 that is keyed to an output shaft 37 suitably journaled in the end walls 13 and 17 and which projects outwardly of the latter for connection to a propeller shaft (not shown). From the foregoing, it will be understood that, when the clutch 20 is engaged, power is transmitted from the input shaft 12 to the clutch 20 and thence through the pinion 35 and gear 36 to the output shaft 37 to provide forward drive.

Also splined to the input shaft 12 and journaled in a bearing 38 carried by the wall 13 is a pinion 39 which always rotates with the input shaft and provides a means for transmitting power to a countershaft forming part of the reverse drive as will now be described.

Referring to Figs. 2 and 3, the pinion 39 meshes with a gear 40 which is appropriately journaled in the end wall 13 and is splinedly connected to the adjacent end of a countershaft 41 which extends longitudinally of the housing 14 parallel to the input shaft 12 and the output shaft 37 and has its opposite end journaled in a bearing 42 carried by the cover plate 16. An annulus 43, suitably spaced from the bearing 42, is formed on the shaft 41 and has its periphery toothed for relative axial sliding and driving engagement with a first plurality of clutch plates which are alternately related to a second plurality of clutch plates whose peripheries have driving and sliding engagement with a plurality of circumferentially spaced, cantilever arms 44. This group of clutch plates constitute part of a reverse drive clutch 45 which is coplanar with the direct clutch 20 transversely of the housing 14.

The arms 44 extend between a back plate 46 and an abutment plate 47 with which the arms are integrally formed and this subassembly is tied together by a plurality of circumferentially spaced bolts 48. The back plate 46 includes a hub 49 that encircles the countershaft 41 between the bearing 42 and the annulus 43 and is shaped on the clutch plate side to form an annular chamber 50 whose inner circumferential surface is defined by the hub 49. An annular piston 51 is slidable in the chamber 50 in actuating relation to the plates of the reverse clutch 45 and its periphery includes a plurality of lugs 52 which are slidable on the bolts 48 so that the piston 51 rotates with the clutch 45 when engaged. A helical spring 53 encircles each bolt 48 between the abutment plate 47 and the associated lug 52 and these springs act to shift the piston 51 to the release position shown in Fig. 2 when the pressure is cut off.

The abutment plate 47, against which the plates of the clutch 45 are engaged, includes a hub 54 that is externally journaled in a bearing 55 carried by the internal wall 31 and is internally splined for connection to the adjacent end of a sleeve 56 that coaxially encircles and is spaced from the countershaft 41. The opposite end of the sleeve 56 is journaled in a bearing 57 carried by the internal wall 34. Between the bearings 55 and 57, the sleeve 56 includes a pinion 58 that meshes with the gear 36. Hence, since the counter shaft 41 always rotates when the engine is operating due to the connection through the pinion 39 and gear 40, reverse drive to the output shaft 37 is effected when the clutch 45 is engaged.

Since the invention is primarily concerned with the relation between the shafts, gears and clutches, the hydraulic circuit which includes the clutches and means for selectively determining their engagement is only diagrammatically shown in Fig. 4 to which reference will now be made.

An oil pump 59 of characteristic type, drivenly connected to the countershaft 41 (see Fig. 2), has its intake connected through a passage 60 to a sump 61 which is constituted by the bottom of the housing 14, while its discharge connects through a passage 62 with the inlet side of a control valve 63. Bridged around the pump 59 is a pressure regulating valve 64 whose outlet connects with the sump 61. The control valve 63 is connectible through a passage 65 with the forward clutch 20, through a passage 66 with the reverse clutch 45, and through a passage 67 with the sump 61, many forms of this type of valve being well known in the art.

The internal construction of the valve 63 is such that in one position the pump 59 connects with the cylinder 25 of the forward clutch 20 to engage the same while connecting the cylinder 50 of the reverse clutch 45 with the sump 61 for release of the latter clutch; in another position, the pump 59 connects with the cylinder 50 of the reverse clutch 45 to engage the same while connecting the cylinder 25 with the sump 61 to insure release of the forward clutch 20; and in still another or neutral position, both clutch cylinders connect with the sump.

As well known in the art, a part of the passage 65 is included in the right end of the input shaft 12 and the hub 24 while a part of the passage 66 is included in the right end of the countershaft 41 and hub 49, all as generally shown in Figs. 1 and 2, respectively, but not specifically identified by numerals.

A marine gear of the above type has many advantages for shipboard use over the more common types wherein the forward and reverse clutches are coaxially related. By mounting these clutches on the input shaft and countershaft, respectively, in coplanar relation transversely of the housing 14, the length of the housing is materially shortened and so provides a stiffer construction. Further, with the clutches so related, it is possible to position them close to one end of the housing, in this case the rear end, where the removal of the cover plate 16 renders the clutches easily accessible for repair. Also, both of the drives have a common terminal in the form of the gear 36 since the pinions 35 and 58 constantly mesh therewith, thus enabling these parts to be characterized by a husky width and ensuing long life. The pinions 35 and 58, featured by a relatively short length with respect to the associated sleeves 32 and 56, respectively, and consequent stiffness, are adequately supported between the bearings 30 and 33, and 55 and 57, and none of the bearings in the transmission ever rotate above engine speed.

I claim:

1. In a marine gear, the combination of a housing having a detachable cover plate at one end thereof, an input shaft, a countershaft having a gear means connection with the input shaft, an output shaft, the shafts being positioned in spaced and parallel relation, a gear secured to the output shaft, first and second, fluid actuated clutches respectively coaxial with the input shaft and countershaft, each clutch including an annular cylinder having a support connection with the cover plate, and first and second pinions having telescopic relation and selectively connectible through the first and second clutches to the input shaft and countershaft, respectively, the first and second pinions meshing with the output shaft gear and being located between the countershaft gear means connection and the first and second clutches, respectively.

2. In a marine gear, the combination of an input shaft, a countershaft having a gear means connection with the input shaft, an output shaft, the shafts being positioned in spaced and parallel relation, a gear secured to the output shaft, first and second sleeves concentric with and spaced from the input shaft and countershaft, respectively, each of the sleeves including a pinion meshing with the output shaft gear, and first and second, selectively engageable, friction clutches respectively coaxial with and having parts connected to the input shaft and countershaft, each clutch including an abutment plate respectively secured to the first and second sleeves whereby the engagement of the first and second clutches respectively provides driving connections between the input shaft and first sleeve pinion and the countershaft and second sleeve pinion, the first and second pinions being located between the countershaft gear means connection and the first and second clutches, respectively.

3. A marine gear as defined in claim 2 wherein each abutment plate is telescoped over and secured to an end of the associated sleeve.

4. In a marine gear, the combination of a housing having a pair of spaced end walls and a pair of spaced, intermediate walls, an input shaft and a countershaft respectively bridged between and bearingly supported only in the end walls, a gear means connection between the input shaft and countershaft, an output shaft, all of the shafts being positioned in spaced and parallel relation, a gear secured to the output shaft, first and second clutches respectively coaxial with the input shaft and countershaft and positioned between an end wall and the adjacent intermediate wall, first and second pinions having telescopic relation and selectively connectible through the first and second clutches to the input shaft and countershaft, respectively, the first and second pinions meshing with the output shaft gear and being located between the intermediate walls, and bearings in the intermediate walls solely supporting the pinions, respectively.

References Cited in the file of this patent

UNITED STATES PATENTS

| | | |
|---|---|---|
| 870,202 | Sponsel | Nov. 5, 1907 |
| 1,248,735 | Sitney | Dec. 4, 1917 |
| 1,701,403 | Coykendall | Feb. 5, 1929 |
| 2,106,958 | Pettit | Feb. 1, 1938 |
| 2,117,852 | Pearmain | May 17, 1938 |
| 2,546,063 | Gerst | Mar. 20, 1951 |